Feb. 10, 1925.
J. C. BROUGHTON
NUT LOCK
Filed May 26, 1922
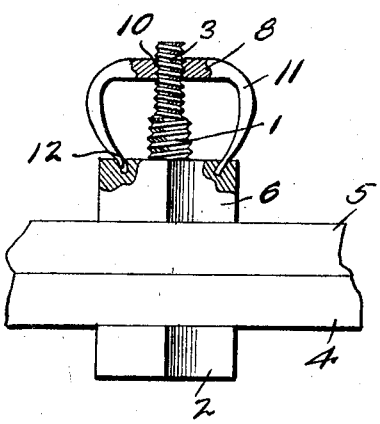
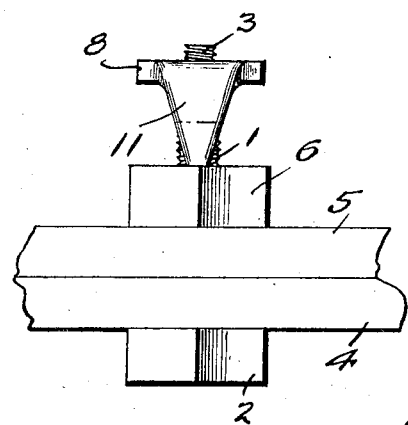
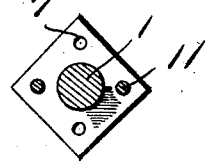
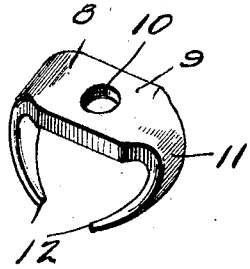
Witnesses
Inventor
J. C. Broughton
By Richard B. Owen
Attorney Patented Feb. 10, 1925.

1,525,979

UNITED STATES PATENT OFFICE.

JOHN C. BROUGHTON, OF BAY MINETTE, ALABAMA.

NUT LOCK.

Application filed May 26, 1922. Serial No. 563,855.

*To all whom it may concern:*

Be it known that I, JOHN C. BROUGHTON, a citizen of the United States, residing at Bay Minette, in the county of Baldwin and State of Alabama, have invented certain new and useful Improvements in Nut Locks, of which the following is a specification.

This invention relates to a nut lock, and has for its principal object to secure an effectual fastening of a nut upon a bolt or screw, whereby accidental displacement is absolutely prevented and casualties resulting from such displacement are in consequence avoided.

Another object of the invention is to provide a nut lock of the above mentioned character, which is simple and efficient in its locking operation, and consists of a locking member carried by the reduced end of a bolt and having means whereby a nut which is carried by the bolt is caused to be engaged by the above mentioned means to permanently hold the nut in place upon the bolt.

A still further object of the invention is to provide a nut lock of the above mentioned character wherein a bolt is screw threaded and has a reduced end portion threaded in the opposite direction to the threads formed on the body portion of the bolt, and a locking means carried by the reduced end portion for engagement with a nut which is screwed upon the bolt.

Another object of the invention is to provide a nut lock of the above mentioned character which is inexpensive in its manufacture, simple and durable in construction.

Other objects of the invention will become apparent during the course of the following description.

In the accompanying drawings forming a part of the description and in which like numerals designate like parts throughout the same, Figure 1 is a front view with several of the parts broken away, Figure 2 is a side view of the nut lock with the same applied to the object upon which the bolt is used, Figure 3 is a perspective view of the locking member, and Figure 4 is a plan view of the nut wherein the bolt is shown in section.

In the drawings wherein for the purpose of illustration is shown the preferred embodiment of my invention, the numeral 1 designates the threaded shank of the bolt of the usual or any preferred construction and having the usual head 2 formed at the opposite end. The threaded portion 1 of the bolt is provided with a reduced end 3 as shown in the drawings in Fig. 1 and this reduced end 3 is provided with screw threads which are formed oppositely to the screw threads formed on the bolt 1.

The bolt is passed through the members 4 and 5 which are to be securely held together, and a head 2 of the bolt is adapted to engage one side of the members 4 and 5 and the threaded portion 1 of the bolt is adapted to pass through the opposite side, and a suitable nut 6 is then screwed upon the threaded portion 1 of the bolt until the same is caused to come into engagement with the side face of the member 5. A plurality of notches or recesses 7 are formed in the outer face of the nut 6 for the purpose hereinafter to be fully set forth. These notches or recesses 7 are arranged in the top face of the nut 6 in diametrically opposed pairs.

A locking member 8 having a body portion 9 which is provided with a threaded aperture 10 for the purpose of screwing the same upon the reduced portion 3 of the bolt and extending outwardly and from the parallel sides of the body portion 9 of the locking member 8 are a pair of spring arms 11. These arms 11 extend from the parallel sides of the member 8 and terminate into tapered points 12.

By forming the spring members 11 in such a manner as to have them extended from the parallel sides of the body portion 9 of the locking member, it will thus be seen that the spring arms 11 are not apt to be broken off of the body portion for the reason that they do not begin to taper downwardly until after they extend beyond the body portion 9.

In use, the nut 6 is fitted upon the screw threaded portion 1 of the bolt and is advanced to the desired position thereon, and the locking member is subsequently fitted upon the reduced screw threaded portion 3 of the bolt and is screwed upon the reduced portion 3 until the free ends of the spring arms 11 are engaged in a pair of diametrically opposed notches 7 formed in the top face of the nut 6, and thus the latter is reliably locked against rotation upon the bolt.

It is to be understood that the form of my invention herein shown and described is to be taken as the preferred example of the same, and various improvements in the shape, size and arrangement of parts may be resorted to without departing from the spirit of the invention or the scope of the subjoined claim.

Having thus described my invention, what I claim is:—

A nut lock and nut therefor, said nut lock comprising an elongated body portion having parallel sides for engagement by a wrench and having a central threaded opening, arms projecting from opposite ends of said body portion and extending outwardly and downwardly in bowed relation, said arms being of triangular shape and reducingly tapered from root to point in both width and thickness the points of said arms being subacute and directed inwardly, and a nut having substantially cylindrical recesses extending from its upper surface and slanting inwardly toward the axis of the nut.

In testimony whereof I affix my signature in presence of two witnesses.

JOHN C. BROUGHTON.

Witnesses:
A. D. DUCK,
BERNICE WHITE.